(12) United States Patent
Molotsi (10) Patent No.: US 8,438,579 B2
(45) Date of Patent: May 7, 2013

(54) SYSTEM AND METHOD FOR TIME TRACKING

(75) Inventor: Hugh N. Molotsi, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1280 days.

(21) Appl. No.: 12/016,145

(22) Filed: Jan. 17, 2008

(65) Prior Publication Data
US 2009/0187922 A1 Jul. 23, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............ 719/318; 719/320; 718/100; 718/102

(58) Field of Classification Search ........................ None
See application file for complete search history.

(56) References Cited

U.S. PATENT DOCUMENTS

| | | |
|---|---|---|
| 2003/0046135 A1 | 3/2003 | Cartwright et al. |
| 2003/0130997 A1* | 7/2003 | Enewoldsen et al. ............. 707/3 |
| 2003/0204367 A1 | 10/2003 | Hartigan et al. |
| 2003/0225989 A1 | 12/2003 | Licalsi |
| 2007/0043605 A1 | 2/2007 | Fisher et al. |
| 2007/0100714 A1 | 5/2007 | Walker |
| 2008/0133287 A1 | 6/2008 | Slattery |
| 2008/0307237 A1* | 12/2008 | Holtzman et al. ............ 713/193 |

OTHER PUBLICATIONS

British Search and Examination Report for related GB Application No. 0823057.5 mailed Apr. 1, 2009, 9 pages.
Rescue Time, Time Management Software & Analytics . . . Ridiculously Easy, http://www.rescuetime.com, Apr. 2007, 1 page.
Chinese Office Action issued in Application No. 200910001813.1, mailed on Apr. 21, 2011, and English translation thereof, 12 pages.

\* cited by examiner

*Primary Examiner* — Andy Ho
*Assistant Examiner* — Craig Dorais
(74) *Attorney, Agent, or Firm* — Osha Liang LLP (57) ABSTRACT

A method for tracking time, including obtaining a plurality of tasks; identify a first open event and a first close event associated with a first file; identifying a start idle event and an end idle event associated with the first file after identifying the first open event; generating a first open event time stamp for the first open event, a first close event time stamp for the first close event, a start idle event time stamp for the start idle event, and an end idle event time stamp for the end idle event; mapping the first file to a first task of the plurality of tasks; and presenting a report including the first task, the first open event time stamp, the first close event time stamp, the start idle event time stamp, and the end idle event time stamp.

16 Claims, 7 Drawing Sheets

SYSTEM 100

| TASK 505 | FILE 510 | EVENT TYPE 515 | TIMESTAMP 520 | USER ID 525 |
|---|---|---|---|---|
| ⊖ | Yyy_aaa.doc | OPEN | 13:00 | MJM |
| ⊖ | Zzz_bbb.pdf | OPEN | 13:50 | JMH |
| ⊖ | Yyy_aaa.doc | IDLE START | 14:00 | MJM |
| ⊖ | Zzz_bbb.pdf | CLOSE | 14:45 | JMH |
| ⊖ | Yyy_aaa.doc | IDLE END | 14:46 | MJM |
| ⊖ | Yyy_aaa.doc | CLOSE | 16:00 | MJM |

500 Report

FIGURE 5

| TASK 605 | FILE 610 | EVENT TYPE 615 | TIMESTAMP 620 | USER ID 625 |
|---|---|---|---|---|
| ⊖ | Yyy_aaa.doc | OPEN | 13:00 | MJM |
| Π | Zzz_bbb.pdf | OPEN | 13:50 | JMH |
| ⊖ | Yyy_aaa.doc | IDLE START | 14:15 | MJM |
| Π | Zzz_bbb.pdf | CLOSE | 14:45 | JMH |
| ⊖ | Yyy_aaa.doc | IDLE END | 14:46 | MJM |
| ⊖ | Yyy_aaa.doc | CLOSE | 16:00 | MJM |

Edit 1 690

Edit 2 692

600 Report

SYSTEM AND METHOD FOR TIME TRACKING

BACKGROUND

Tracking the time spent by an employee (or contractor) on various tasks is a critical component in the operation of an organization. Typically, the organization requires the employee to manually track and record the amount of time being spent on each task using, for example, a timesheet. A timesheet may record the start and end time of tasks, or just the duration. A timesheet may also contain a detailed breakdown of tasks accomplished throughout the project or program. This information may be used for payroll, client billing, and increasingly for project costing, estimation, tracking and management.

At the end of each day, week, month, or as dictated by the policies of the organization, the employee submits the timesheet to an organization's administrator who then manually re-enters the timesheet into the correct systems (i.e., payroll, billing, reporting, etc.). Both the completion of the timesheet by worker and the entry of the timesheet into a system by the administrator are opportunities for human error.

SUMMARY

In general, in one aspect, the invention relates to a method for tracking time. The method includes obtaining a plurality of tasks; identify a first open event and a first close event associated with a first file; identifying a start idle event and an end idle event associated with the first file after identifying the first open event; generating a first open event time stamp for the first open event, a first close event time stamp for the first close event, a start idle event time stamp for the start idle event, and an end idle event time stamp for the end idle event; mapping the first file to a first task of the plurality of tasks; and presenting a report including the first task, the first open event time stamp, the first close event time stamp, the start idle event time stamp, and the end idle event time stamp.

In general, in one aspect, the invention relates to a computer readable medium storing instructions for tracking time. The instructions include functionality to obtain a plurality of tasks; identify a first open event and a first close event associated with a first file; identify a start idle event and an end idle event associated with the first file after identifying the first open event; generate a first open event time stamp for the first open event, a first close event time stamp for the first close event, a start idle event time stamp for the start idle event, and an end idle event time stamp for the end idle event; map the first file to a first task of the plurality of tasks; and present a report including the first task, the first open event time stamp, the first close event time stamp, the start idle event time stamp, and the end idle event time stamp.

In general, in one aspect, the invention relates to a system for tracking time. The system includes a task repository storing a plurality of tasks; an application executing an open event and a close event associated with a file; an event manager operatively connected to the task repository and the application, wherein the event manager is configured to map the file to a first task of the plurality of tasks; and a report generator operatively connected to the event manager and configured to generate a report including the first task, an open event timestamp for the open event and a close event timestamp for the close event.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to track time based on file events, timestamps for the file events, and mappings relating the file events to one or more tasks. In general, embodiments of the provide a system and method to track time using a report generator for creating and editing one or more reports including file events, timestamps for the file events, and mappings relating the file events to one or more tasks.

Figure 1:
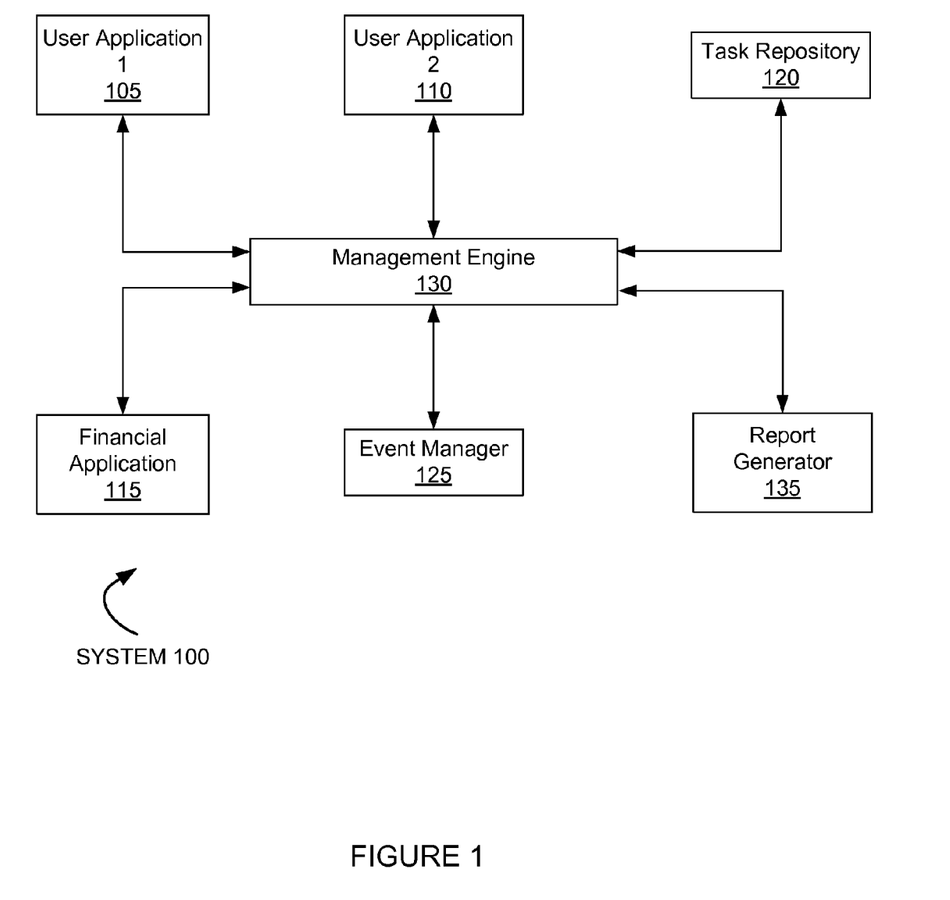
FIG. 1 shows a system in accordance with one or more embodiments of the invention.

FIG. 1 shows a system (100) in accordance with one or more embodiments of the invention. As shown in FIG. 1, the system (100) has multiple components including one or more user applications (i.e., User Application 1 (105), User Application 2 (110)), a task repository (120), a financial application (115), an event manager (125), a report generator (135), and a management engine (130). These components are described below and may be located on the same device (e.g., a server, mainframe, desktop Personal Computer (PC), laptop, Personal Digital Assistant (PDA), television, cable box, satellite box, kiosk, telephone, mobile phone, etc.) or may be located on separate devices connected by a network (e.g., the Internet), with wired and/or wireless segments.

In one or more embodiments of the invention, the task repository (120) stores one or more tasks to be completed. Each task in the task repository (120) may include both an identification linking the task to a specific client (i.e., client ID) and an identification linking the task to a project for the specific client (i.e., project ID). The client ID and the project ID may be maintained separately within the task repository (120) and/or concatenated for storage as a single value. The task repository (120) may be a database, a flat file, or any type of datastore. New tasks may be added to the task repository (120) and existing tasks may be modified and/or deleted.

In one or more embodiments of the invention, the user applications (i.e., User Application 1 (105), User Application 2 (110)) access, modify, and/or create files. It is through the access, modification, and/or creation of a file that a task, or at least a portion of a task, is completed. In other words, in order to complete a task, one or more files must be accessed, modified, and/or created. A user application may be, for example, a word processing application, a database application, a spreadsheet application, an image processing application, a software development application, a multimedia application, etc. Accordingly, the files that are accessed, modified, and/or created to complete at least a portion of a task may include document files, database files, spreadsheet files, image files, sound clips, movie clips, etc.

In one or more embodiments of the invention, a user application executes a file event when a file is accessed, modified, and/or created by the user application. For example, a user application executes a file open event when a file is opened by the user application. Similarly, a user application executes a file close event when a file is closed by the user application. In addition, a user application executes an idle start event when it places an open file into idle mode because no changes have been made to the open file within a predetermined period of time (i.e., the file is open but inactive). Further still, a user application executes an end idle event when a file, currently in idle mode, is manipulates, effectively breaking the idle state. Those skilled in the art, having the benefit of this detailed description, will appreciate many other potential file events may be executed.

In one or more embodiments of the invention, the event manager (125) is configured to monitor the user applications (i.e., User Application 1 (105), User Application 2 (110)) for the execution of file events. Once a file event has been executed, the event manager (125) may identify the type of file event (e.g., open event, close event, idle start event, idle end event, etc.), and generate a timestamp for the file event.

In one or more embodiments of the invention, the event manager (125) includes functionality to map a file event, specifically a file associated with the file event, to a task in the task repository (120). In other words, the event manager (125) is configured to determine the task requiring the access, creation, and/or modification of the file. In one or more embodiments of the invention, the mapping of a file event is based on the name of the file. In such embodiments, a keyword in the filename is used in the search criteria for identifying the corresponding task. In one or more embodiments of the invention, the mapping is based on all or a portion of the file content (e.g., the first page of the file, a header of the file, a footer of a file, a table of contents of a file, etc.). In such embodiments, a value (e.g., numerical values, strings, etc.) from the file content is used in the search criteria for identifying the corresponding task.

In one or more embodiments of the invention, the event manager (125) is configured to improve said search criteria and/or search strategies based on user edits (discussed below). For example, a user may identify an incorrect mapping performed by the event manager (125) and replace the incorrectly identified task with the correct task. In response, the event manager (125) may update the existing search criteria and/or search strategies to avoid making similar errors in future mappings. In other words, the event manager (125) may have a learning component to improve the mapping functionality of the event manager (125).

In one or more embodiments of the invention, the event manager (125) receives mapping information linking an identified file event with the corresponding task. The mapping information may be provided by the user application (i.e., User Application 1 (105), User Application 2 (110)) through an application program interface (API) (not shown). The mapping information may explicitly identify the task requiring the access, modification, and/or creation of the file, or may provide addition search criteria for locating the task corresponding to the file.

In one or more embodiments of the invention, the report generator (135) includes functionality to generate and/or edit one or more reports comprising (i) the file events identified by the event manager (125); (ii) the tasks corresponding to the identified file events, as determined by the event manager (125); (iii) the user applications (i.e., User Application 1 (105), User Application 2 (110))) executing the identified file events; and (iv) the timestamps associated with the file events. A report may also identify the operators of the user applications executing the file events. The one or more reports may be sorted and/or filtered based on any criteria. In addition, the one or more reports may be stored, printed, displayed, and/or transmitted (i.e., to a user) in any format (e.g., hypertext markup language (HTML), extensible markup language (XML), Javascript, XFORMS, microformat, etc.).

In one or more embodiments of the invention, the report generator (135) includes functionality to track the time spent working on a task using the file events that map to the task, and the timestamps associated with said file events. In other words, as file events are associated with timestamps, and file events are executed to complete at least a portion of a task, it is possible to track the time spent working on the task. Similarly, it is possible to track the amount of time a specific user has spent working on one or more tasks.

In one or more embodiments of the invention, the financial application (115) includes functionality to perform billing and/or payment functions based on a report from the report generator (135). For example, the financial application (115) may be configured to generate a bill for any time spent working on one or more tasks. Alternatively, the financial application (115) may be configured to issue a payment (i.e., to a user) for the time spent on one or more tasks.

In one or more embodiments of the invention, the management engine (130) provides an interface to the user applications (i.e., User Application 1 (105), User Application 2 (110)), the task repository (120), the report generator (135), the event manager (125), and the financial application (115). The interface provided by the management engine (130) may include a graphical user interface (GUI) configured to accept inputs (e.g., keyboard input, cursor input, voice commands, etc.) from the user and produce outputs using a display screen, a printer, audio speakers, etc. The management engine (130) may direct the activities of the components in system (100) and translate data from the format of one component to the format of another component, as required.

Using the system describe in FIG. 1, the time spent by an employee (or contractor) working on one or more tasks is automatically tracked. This allows the employee to devote more time to the actual task he or she was hired to execute and less time to administrative responsibilities (e.g., completing timesheets). In addition, the automatic tracking of time may also reduce the number of clerical errors introduced by the worker completing the timesheet and the administrator re-entering the timesheet.

Figure 2:
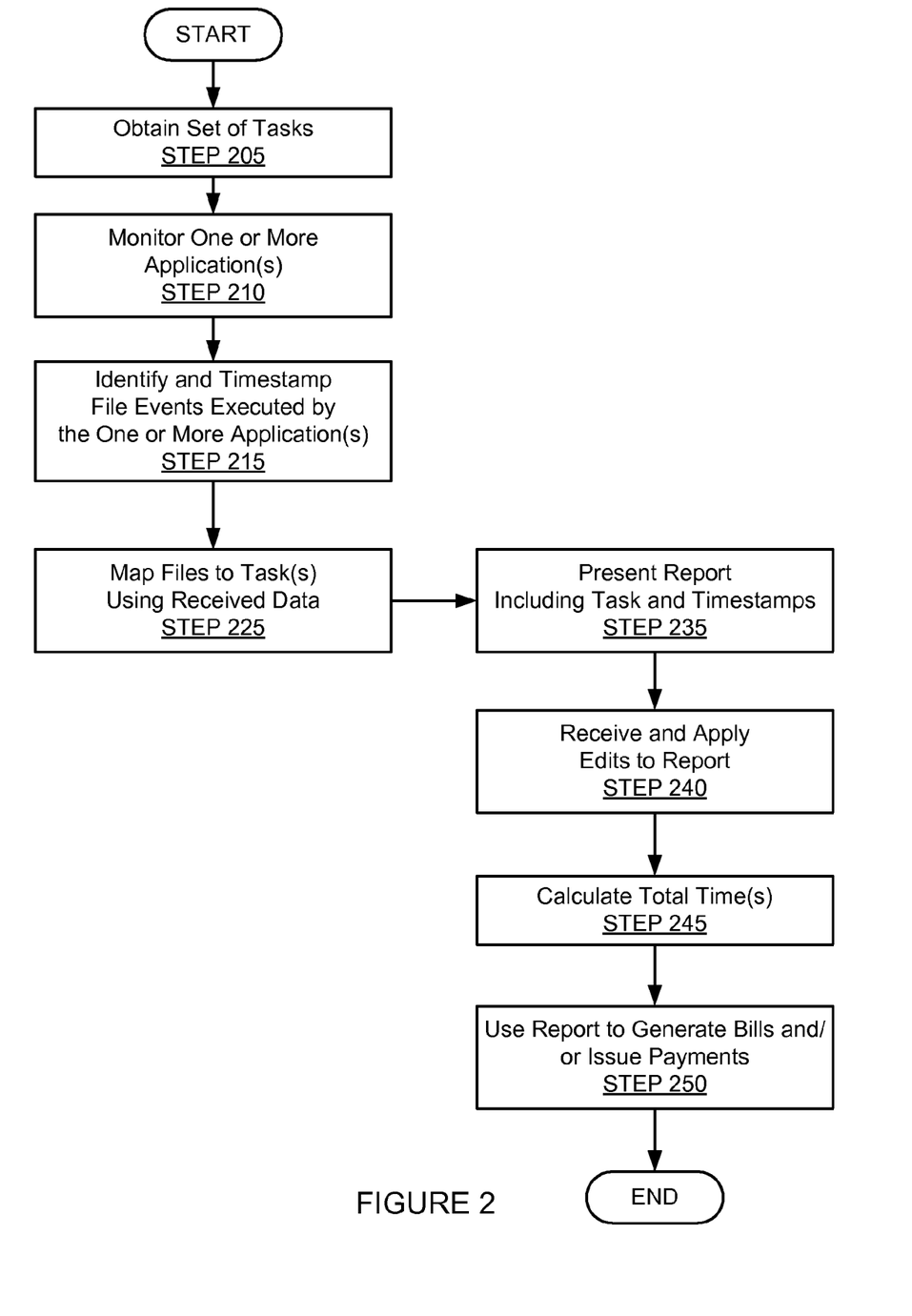
FIGS. 2 and 3 show flowcharts in accordance with one or more embodiments of the invention.

FIG. 2 shows a flowchart in accordance with one or more embodiments of the invention. The process shown in FIG. 2 may be used, for example, by the system (100) for mapping file events to tasks and generating one or more reports based on the identified file events. Those skilled in the art, having the benefit of this detailed description, will appreciate the sequence of steps shown in FIG. 2 may differ among embodiments of the invention, and that one or more of the steps may be optional.

Initially, a set of tasks is obtained. The set of tasks may be entered by a user and/or imported from a third-party source. As discussed above, each task in the set may include both an identification linking the task to a specific client (i.e., client ID) and an identification linking the task to a project for the specific client (i.e., project ID). As also discussed above, at least a portion of a task may be completed through the access, modification, and/or creation of a file. Once the set of tasks is obtained, the set of tasks may be stored (e.g., in the task repository (120)), presented (e.g., displayed, printed, etc.), searched, and/or transmitted at any time.

In STEP 210, one or more user applications are monitored for file events. As discussed above, the user applications may execute one or more file events when a file is accessed, modified, and/or created. The monitoring of the user applications may be automatically initiated upon startup of the user applications and/or the monitoring may be initiated manually by the operator(s) (i.e., user(s)) of the user applications. The monitoring of the user applications may be transparent to the users.

In STEP 215, one or more file events are identified and a timestamp for each of the identified file events is generated. As discussed above, a file event may be executed when a file is accessed, modified, and/or created, and identifying the file events includes identifying the types of file events executed by the user applications (i.e., open event, close event, start idle event, end idle event). In one or more embodiments of the invention, the time stamps indicate the time the file events started executing or the time the file events finished executing.

As discussed above, each executed file event is associated with a file. In STEP 225, each file event, and thus the corresponding file, is mapped to a task. In one or more embodiments of the invention, the names of the files may be used to map the files to the tasks. In such embodiments, a keyword in the filename is used in the search criteria for identifying the corresponding task. In one or more embodiments of the invention, the mapping is based on all or a portion of the file content (e.g., the first page of the file, a header of the file, a footer of a file, a table of contents of a file, etc.). In such embodiments, a value (e.g., numerical values, strings, etc.) from the file content is used in the search criteria for identifying the corresponding task.

In one or more embodiments of the invention, data may be sent by the user applications for use in mapping file events, specifically the files associated with the file events, to the corresponding tasks. The received data may explicitly identify the task corresponding to the file (e.g., the data may provide the client ID and the project ID of the corresponding task), or the data may provide keywords for searching the set of tasks.

In STEP 235, a report is presented and may include (i) the identified file events; (ii) the tasks corresponding to the identified file events, as determined in STEP 225; (iii) the user applications executing the identified file events; and (iv) the timestamps associated with the file events. The contents of the report can be sorted and/or filtered based on any criteria, and the report itself may be stored, displayed, printed, and/or transmitted in any format. In one or more embodiments of the invention, the report is transmitted to the operators (i.e., users) of the user applications for review.

In STEP 240, one or more edits associated with the report are received (e.g., from the users) and applied to the report. The edits may attempt to change one or more of the timestamps in the report and/or the edits may attempt to change one or more tasks in the report that where incorrectly mapped from the file events. In one or more embodiments of the invention, any submitted edit may be subject to review prior to amending the report based on the edit. Those skilled in the art, having the benefit of this detailed description, will appreciate that preventing a user from having direct write access to a report may reduce attempts to fabricate data in the report.

In STEP 245, the time spent by one or more users working on one or more tasks is calculated using the report. Since file events are associated with timestamps, and file events are executed to complete at least a portion of a task, it is possible to track the time spent working on the task. Similarly, it is possible to track the amount of time a specific user has spent working on one or more tasks (discussed below).

In STEP 250, the report and/or the calculated time spent on one or more tasks is used to generate bills and/or issue payments. For example, a bill for the time spent on a task by all users may be generated and sent to the client associated with the task. Similarly, a bill for all tasks associated with a specific client may be generated based on the report and the total time calculation(s). Alternatively, compensation (i.e., a payment) for the time spent by a user working on a task may be issued. In one or more embodiments of the invention, the billing and/or payment functions and/or the time spent calculations are carried out by a financial application (i.e., financial application (115)).

Although embodiments of the invention have been focused on the generation/presentation of a single report, those skilled in the art, having the benefit of this detailed description, will appreciate that any number of reports may be presented. A report may be focused solely on one task, one client having multiple tasks, all tasks worked on by a specific user, etc.

Figure 3:
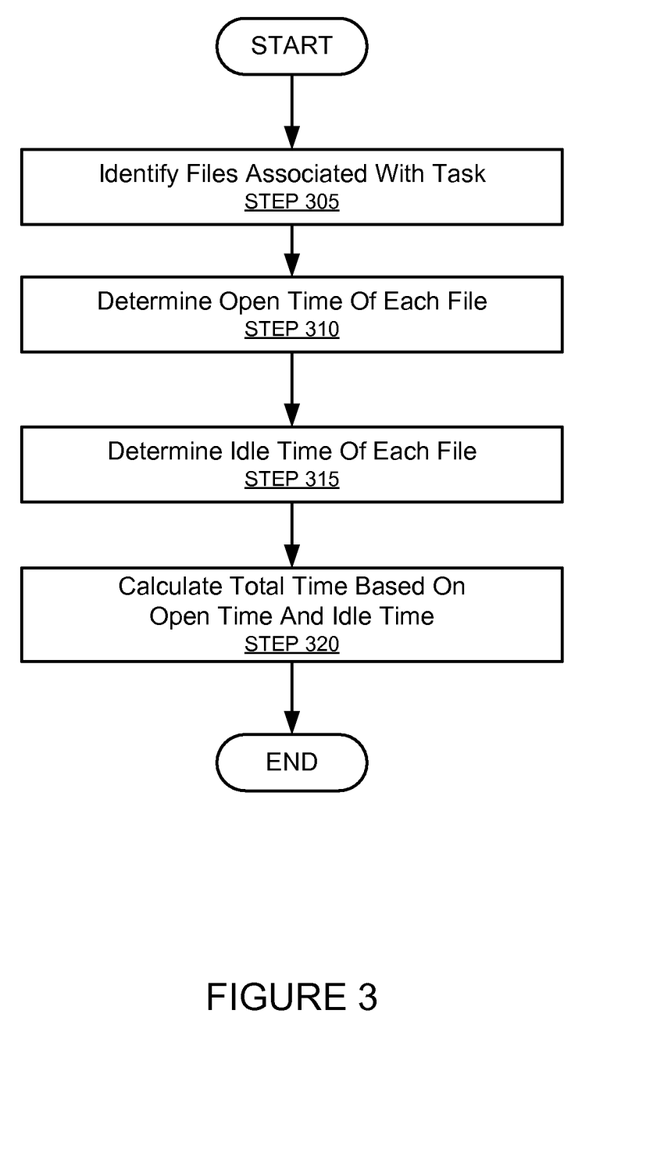

FIG. 3 shows a flowchart in accordance with one or more embodiments of the invention. The process shown in FIG. 3 may be used, for example, by STEP 245 of FIG. 2, to track the time spent working on a task. The calculations may be based on the values (e.g., timestamps) (discussed above). Those skilled in the art, having the benefit of this detailed description, will appreciate the sequence of steps shown in FIG. 3 may differ among embodiments of the invention, and that one or more of the steps may be optional.

Initially, the files associated with the task are determined (STEP 305). As discussed above, the access, modification, and/or creation of files may be used to complete at least a portion of the task. As these files map to the task, these files may be found by searching the generated report based on the task In STEP 310, the open time of each file is determined. The open time is the duration of time the file was open on a user application. In one or more embodiments of the invention, the open time is determined by calculating a difference between a timestamp for a close event associated with the file and a timestamp for an open event associated with the file. As a file may be opened and closed any number times, it may be necessary to calculate the difference between the close event timestamp and the open event timestamp for each open event/close event pair. The sum of these differences represents the open time of the file.

In STEP 315, the idle time of each file is determined. The idle time is the duration of time the file was open and idle. In one or more embodiments of the invention, the idle time is determined by calculating the difference between a timestamp for an end idle event associated with the file and a timestamp for a start idle event associated with the file. As a file may enter an idle state any number of times, it may be necessary to calculate the difference between the end idle timestamp and the start idle timestamp for each start idle/end idle event pair. The sum of these differences represents the idle time of the file.

In STEP 320, the total time for a given task is calculated based on the open time and the idle time of the files. In one or more embodiments of the invention, the total time is given by:

$$\text{Total Time} = \sum_i [closeTS_i - openTS_i] - \sum_j [idleEndTS_j - idleStartTS_j]$$

where $closeTS_i$ is the timestamp of the $i^{th}$ close event, $openTS_i$ is the timestamp of the $i^{th}$ open event, $idleEndTS_j$ is the timestamp of the $j^{th}$ idle end event, and $idleStartTS_j$ is the timestamp of the $j^{th}$ idle start event.

Those skilled in the art, having the benefit of this detailed description, will appreciate that the process shown in FIG. 3 may be repeated for any number of tasks. Further, by identifying files associated with a user instead of a task (i.e., STEP 305), it is possible to track the total time spent by the operator working on one or more tasks. Further still, by identifying files associated with a client instead of a specific task (i.e., STEP 305), it is possible to track the time spent on all tasks for the client.

Figure 4:
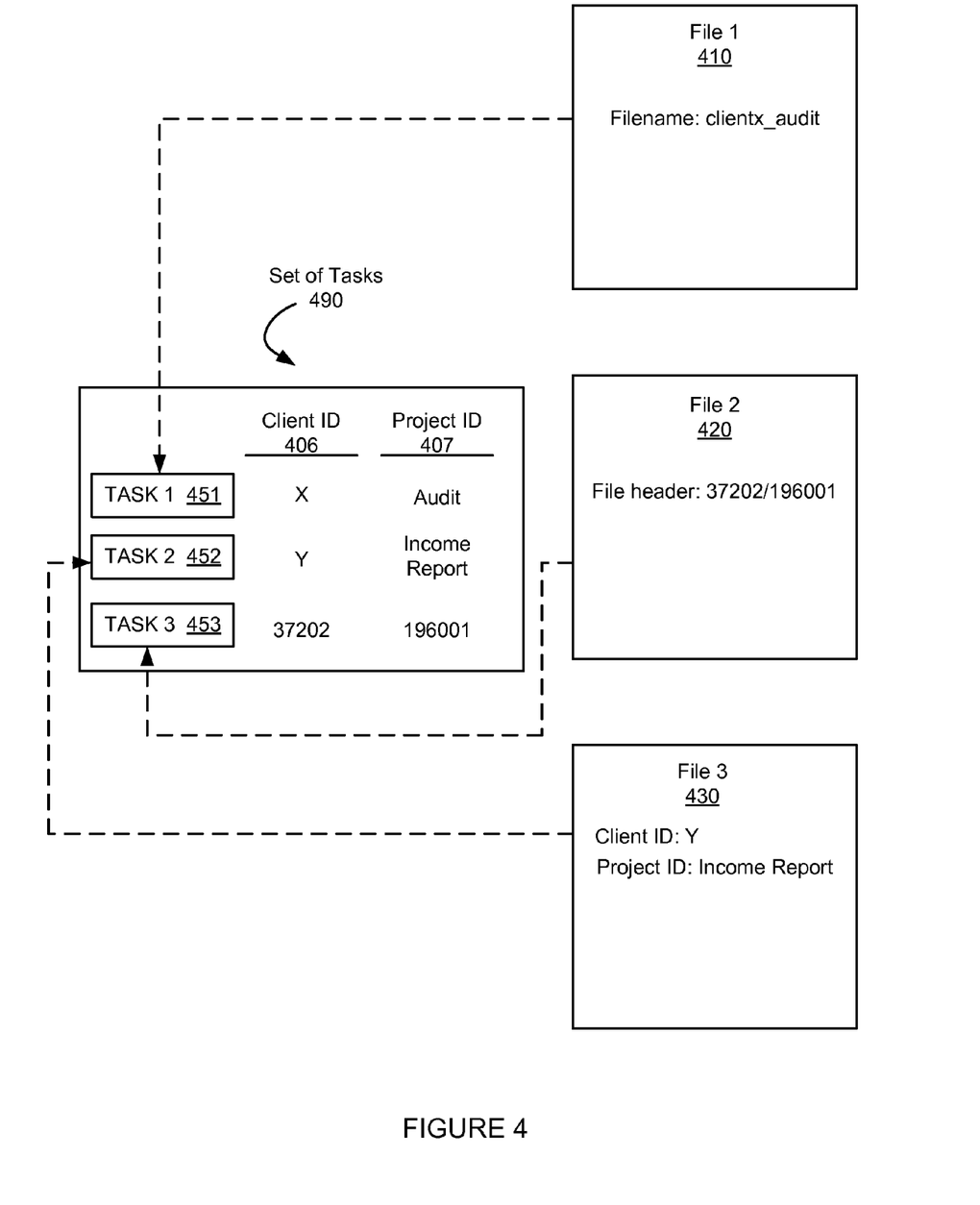
FIGS. 4, 5, and 6 show examples in accordance with one or more embodiments of the invention.

FIG. 4 shows an example in accordance with one or more embodiments of the invention. Specifically, the example in FIG. 4 depicts the mapping of files, associated with file events, to tasks. As shown in FIG. 4, the example includes three files (i.e., file 1 (410), file 2 (420), and file 3 (430)) and a set of tasks (i.e., Task 1 (451), Task 2 (452), Task 3 (453)), with each task having a client ID (406) and a project ID (407).

In one or more embodiments of the invention, the user applications associated with file 1 (410), file 2 (420), and/or file 3 (430) (not shown) are monitored for file events. When a file event is identified, a timestamp for the file event may be generated (discussed above), and the file (i.e., File 1 (410), File 2 (420), File 3 (430)) associated with the file event is mapped to a task (i.e., Task 1 (451), Task 2 (452), Task 3 (453)). In one or more embodiments of the invention, the mapping is determined by extracting keywords from the filename or from the file content and then using the extracted keywords to search the set of tasks (490). In one or more embodiments of the invention, the mapping is based on information received from a user application explicitly disclosing the corresponding task (e.g., by disclosing the client ID and a project ID of the corresponding task).

As shown in FIG. 4, file 1 (410) is mapped to task 1 (451) in the set of tasks (490). The mapping of file 1 (410) to task 1 (451) is based on the filename (i.e., "ClientX_Audit") of file 1 (410) using one or more keywords of the file name. In contrast, file 2 (420) is mapped to task 3 (453) in the set of tasks (490). The mapping of file 2 (420) to task 3 (453) is based on a header (i.e., "37202/196001") in file 2 (420). Further, file 3 (430) is mapped to task 2 (452) in the set of tasks (490). The mapping of file 3 (430) to task 2 (452) is based on the received information explicitly identifying the task (i.e., client ID "Y" and project ID "Income Report").

Figure 5:
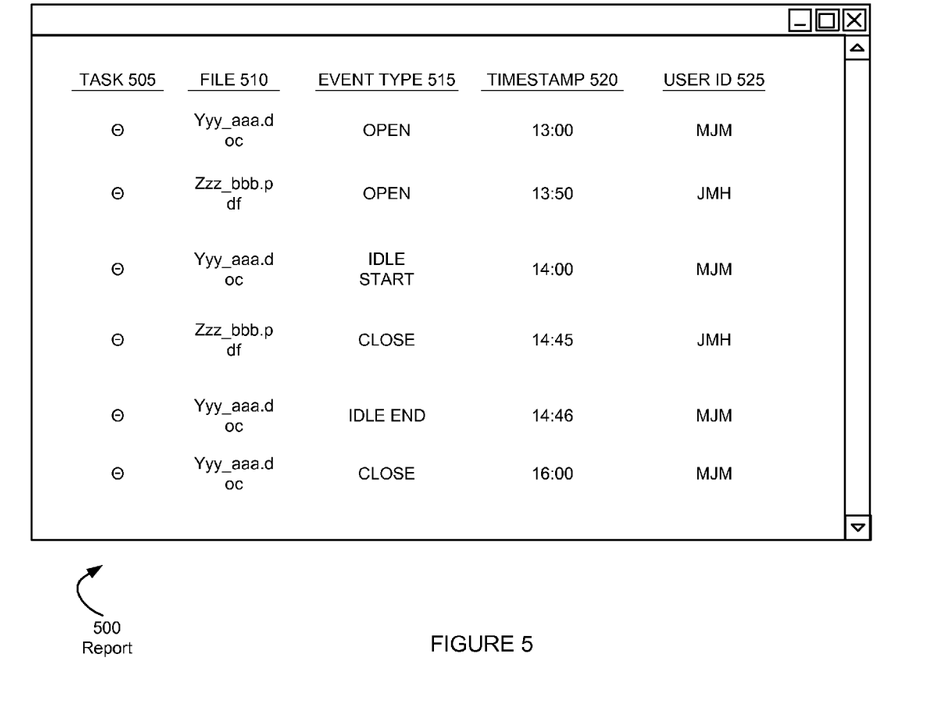

FIG. 5 shows an example report (500) in accordance with one or more embodiments of the invention. Specifically, FIG. 5 depicts a report (500) arranging data in columns. The columns list the identified file events (515), the files (510) associate with each of the identified file events, the task (505) corresponding to each file, the timestamp (520) associated with each file (510), and the user ID (525) of the operator associated with the file events (i.e., the user operating the applications executing the file events). Although data in the report (500) is shown arranged in columns, those skilled in the art, having the benefit of this detailed description, will appreciate that the data in the report (500) may be arranged in any format.

Figure 6:
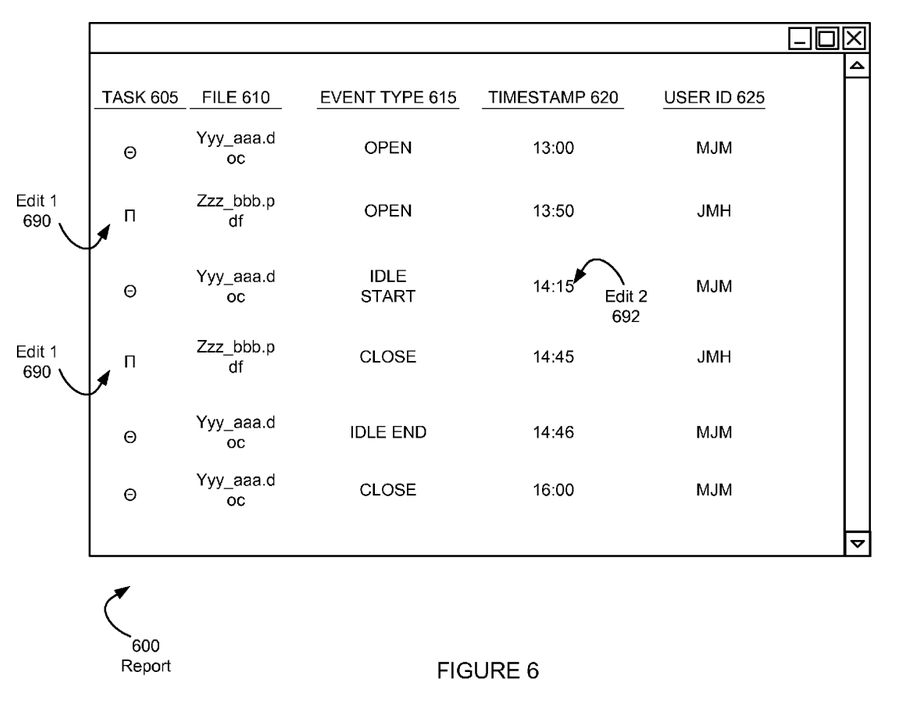

FIG. 6 shows an example report (600) in accordance with one or more embodiments of the invention. The report (600) may essentially be report (500), discussed above in reference to FIG. 5, following the application of one or more edits (i.e., Edit 1 (690), Edit 2 (692)). The report (600) may be essentially the same as report (500). In other words, the columns listing the tasks (605), files (610), event types (615), timestamps (620), and user IDs (625), are essentially the same as the columns listing the tasks (505), files (510), event types (515), timestamps (520), and user IDs (525), discussed above in reference to FIG. 5. In addition, the report (600) includes multiple edits (i.e., Edit 1 (690), Edit 2 (692)).

In one or more embodiments of the invention, edit 1 (690) is received from a user (e.g., the user with user ID "JMH") and applied to the report (600). The edit 1 (690) is to change the mapping of file "zzz_bbb.pdf" to task "HIT" instead of task "Θ". In other words, it was previously determined that the file "zzz_bbb.pdf" maps to task "Θ" (as shown in FIG. 5). However, this mapping was found to be incorrect by the user and the user has provided the correct mapping.

In one or more embodiments of the invention, edit 2 (692) is received from a user and applied to the report (600). The edit 2 (692) is to change the timestamp of the idle start event to time "14:15" instead of time "14:00". In other words, it was previously determined that an idle start event for the file "yyy_aaa.doc" occurred at time "14:00" (as shown in FIG. 5). However, this timestamp was found to be incorrect by the user and the user has provided the correct timestamp.

Figure 7:
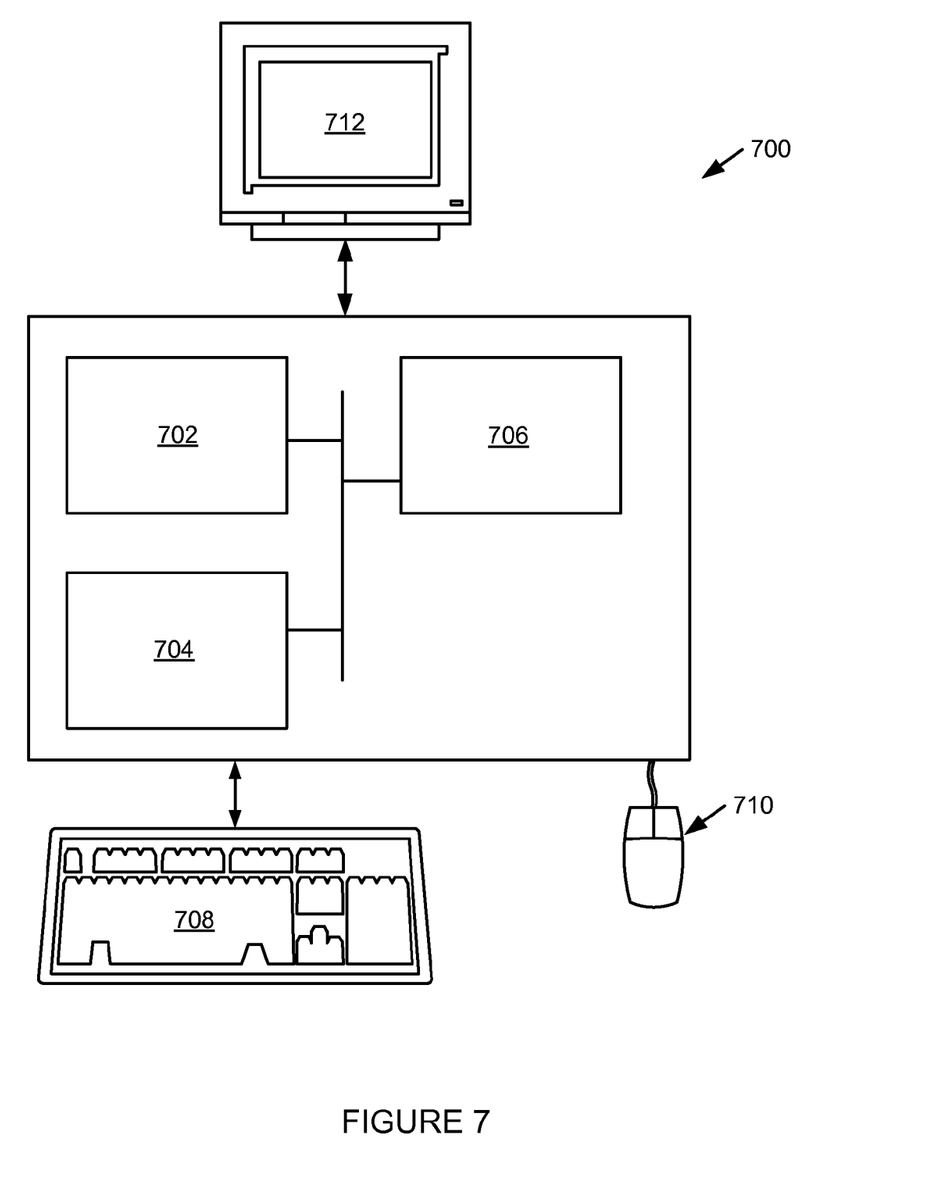
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking time, comprising:
   obtaining, by a hardware processor, a plurality of tasks comprising a plurality of identifiers;
   identifying, by the hardware processor, a first open event and a first close event associated with a first file comprising a coverpage with text;
   identifying, by the hardware processor, a start idle event and an end idle event associated with the first file after identifying the first open event;
   generating, by the hardware processor, a first open event time stamp for the first open event, a first close event time stamp for the first close event, a start idle event time stamp for the start idle event, and an end idle event time stamp for the end idle event;
   extracting, by the hardware processor, a keyword located on the coverpage of the first file;
   matching, by the hardware processor, the keyword to an identifier corresponding to a first task during a search of the plurality of identifiers, wherein the search comprises the keyword as a search criterion;
   mapping, by the hardware processor and in response to matching the keyword to the identifier during the search, the first file to the first task of the plurality of tasks, wherein the first task requires modification of the first file;
   determining a first difference between the first open event time stamp and the first close event time stamp;
   determining a second difference between the end idle event time stamp and the start idle event time stamp;
   tracking a total time associated with the first task by subtracting the second difference from the first difference; and
   presenting, by the hardware processor, a report including the first task, the total time, the first open event time stamp, the first close event time stamp, the start idle event time stamp, and the end idle event time stamp.

2. The method of claim 1, wherein mapping the first file comprises:
   receiving data linking the first file to the first task from an application executing at least one selected from a group consisting of the first open event and the first close event.

3. The method of claim 1, further comprising:
   sending the report to a user;
   receiving an edit after sending the report; and
   replacing the first task in the report with a second task based on the edit.

4. The method of claim 1, further comprising:
   sending the report to a user;
   receiving an edit after sending the report; and
   replacing at least one selected from the group consisting of the start idle event and the end idle event based on the edit.

5. The method of claim 1, further comprising:
   identifying a second open event and a second close event for a second file, wherein the second file is mapped to the first task; and
   generating a second open event time stamp for the second open event and a second close event time stamp for the second close event, wherein the report further includes the second open event time stamp and the second close event time stamp.

6. The method of claim 1, wherein the report is used to generate a bill.

7. A non-transitory computer readable medium storing instructions for tracking time, the instructions comprising functionality to:
   obtain a plurality of tasks comprising a plurality of identifiers;
   identify a first open event and a first close event associated with a first file comprising a coverpage with text;
   identify a start idle event and an end idle event associated with the first file after identifying the first open event;
   generate a first open event time stamp for the first open event, a first close event time stamp for the first close event, a start idle event time stamp for the start idle event, and an end idle event time stamp for the end idle event;
   extract a keyword located on the coverpage of the first file;
   match the keyword to an identifier corresponding to a first task during a search of the plurality of identifiers, wherein the search comprises the keyword as a search criterion;
   map, in response to matching the keyword to the identifier during the search, the first file to the first task of the plurality of tasks, wherein the first task requires modification of the first file;
   determine a first difference between the first open event time stamp and the first close event time stamp;
   determine a second difference between the end idle event time stamp and the start idle event time stamp;
   track a total time associated with the first task by subtracting the second difference from the first difference; and
   present a report including the first task, the total time, the first open event time stamp, the first close event time stamp, the start idle event time stamp, and the end idle event time stamp.

8. The computer readable medium of claim 7, wherein the instructions to map the first file comprise functionality to:
   receive data linking the first file to the first task from an application executing at least one selected from a group consisting of the first open event and the first close event.

9. The computer readable medium of claim 7, the instructions further comprising functionality to:
   send the report to a user;
   receive an edit after sending the report; and
   replace the first task in the report with a second task based on the edit.

10. The computer readable medium of claim 7, the instructions further comprising functionality to:
    send the report to a user;
    receive an edit after sending the report; and
    replace at least one selected from the group consisting of the start idle event and the end idle event based on the edit.

11. The computer readable medium of claim 10, the instructions further comprising instructions to:
    identify a second open event and a second close event for a second file, wherein the second file is mapped to first task; and
    generate a second open event time stamp for the second open event and a second close event time stamp the second close event, wherein the report further includes the second open event time stamp and the second close event time stamp.

12. The computer readable medium of claim 10, wherein the report is used to generate a bill.

13. A system for tracking time, comprising:
a hardware processor;
a task repository executing on the hardware processor and storing a plurality of tasks comprising a plurality of identifiers;
an application executing an open event and a close event associated with a file comprising a coverpage with text;
an event manager executing on the hardware processor and operatively connected to the task repository and the application, wherein the event manager is configured to:
extract a keyword located on the coverpage of the file,
match the keyword to an identifier corresponding to a first task during a search of the plurality of identifiers, wherein the search comprises the keyword as a search criterion, and
map, in response to matching the keyword to the identifier during the search, the file to the first task of the plurality of tasks;
generate an open event timestamp for the open event, a close event time stamp for the close event; and
a report generator executing on the hardware processor and operatively connected to the event manager and configured to:
determine a first difference between the open event time stamp and the close event time stamp;
determine a second difference between an end idle event time stamp for an end idle event associated with the file, and a start idle event time stamp associated with a start idle event associated with the file;
track a total time associated with the task by subtracting the second difference from the first difference; and
generate a report including the first task, the total time, the open event timestamp, the close event timestamp, the start idle event time stamp, and the end idle event time stamp.

14. The system of claim 13, wherein the event manager is further configured to receive data from the application linking the file to the first task.

15. The system of claim 13, wherein the report generator is further configured to:
send the report to the user;
receive an edit after sending the report; and
replace the first task in the report with a second task based on the edit.

16. The system of claim 13, further comprising a financial application operatively connected to the report generator and configured to generate at least one selected from a group of a bill based on the report and a payment based on the report.

* * * * *